(12) United States Patent
Jan

(10) Patent No.: US 6,481,062 B1
(45) Date of Patent: Nov. 19, 2002

(54) FASTENING BELT

(76) Inventor: I-Hwu Jan, No. 102, Sec. 2, Chien Kuo S. Rd., Taichung (TW)

(*) Notice: Subject to any disclaimer, the term of this patent is extended or adjusted under 35 U.S.C. 154(b) by 0 days.

(21) Appl. No.: 09/918,514

(22) Filed: Aug. 1, 2001

(51) Int. Cl.⁷ ................................................. B65D 63/00
(52) U.S. Cl. ................ 24/20 CW; 24/20 R; 24/20 EE; 24/20 W; 24/23 EE; 24/23 W
(58) Field of Search ........................... 24/20 CW, 20 R, 24/20 EE, 20 W, 23 EE, 23 W

(56) References Cited

U.S. PATENT DOCUMENTS

| 3,235,925 A | * | 2/1966 | Gerhardt et al. | ........... 24/23 EE |
| 3,869,944 A | * | 3/1975 | Detiker | ................... 24/20 CW |
| 4,991,266 A | * | 2/1991 | Oetiker | ........................ 24/20 R |
| 5,105,509 A | * | 4/1992 | Lilley | .......................... 24/20 R |
| 5,235,729 A | * | 8/1993 | Tiegs et al. | .............. 24/20 CW |
| 5,305,499 A | * | 4/1994 | Oetiker | ........................ 24/20 R |
| 5,713,107 A | * | 2/1998 | Jan | .......................... 24/20 CW |
| 6,131,245 A | * | 10/2000 | Chi | ............................. 24/20 R |

FOREIGN PATENT DOCUMENTS

| JP | 2005552 | * | 9/1991 | ............. 24/20 CW |
| JP | 219960 | * | 8/2001 | ............. 24/20 CW |

* cited by examiner

*Primary Examiner*—Victor Sakran
(74) *Attorney, Agent, or Firm*—Charles E. Baxley

(57) ABSTRACT

A fastening belt includes a belt having a corrugation on a first side thereof and a plurality of holes defined through the belt and near a first end of the belt. A plurality of teeth extend from a second side of the belt and toward inclinedly a second end of the belt. A protrusion extends from the second side of the belt and is located between the corrugation and the teeth. The protrusion extends inclinedly toward the first end of the belt. The teeth and the protrusion are respectively engaged with the holes to wrap around an end of a bellow on a shaft. The protrusion prevents the belt from loosening.

2 Claims, 6 Drawing Sheets

FASTENING BELT

FIELD OF THE INVENTION

The present invention relates to a fastening belt having an anti-loosening protrusion which extends in an opposite direction to the teeth so as to effectively prevent the fastening belt from loosening.

BACKGROUND OF THE INVENTION

U.S. Pat. No. 5,713,107 disclosed a fastening belt and is shown in FIGS. 1 to 3, and is wrapped around each of two ends of a bellow 20 on a shaft 21. The teeth 12 are engaged with holes 13 of the belt 10 and a corrugation 11 is then clamped by a tool to pull the teeth 12 to securely engage with the holes 13. However, the engagement between the teeth 12 and the holes 13 could be loosened because of vibration.

SUMMARY OF THE INVENTION

In accordance with one aspect of the present invention, there is provided a fastening belt which comprises a belt having a corrugation extending from a first side thereof and the corrugation is located close to a first end of the belt. A plurality of holes is defined through the belt near a second end of the belt. A plurality of teeth extend from a second side of the belt and toward inclinedly the second end of the belt. A protrusion extends from the second side of the belt and is located between the corrugation and the teeth. The protrusion extends inclinedly toward the first end of the belt.

The primary object of the present invention is to provide a protrusion extending in an opposite direction to the direction of the teeth on the fastening belt. The protrusion prevents the belt from loosening.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
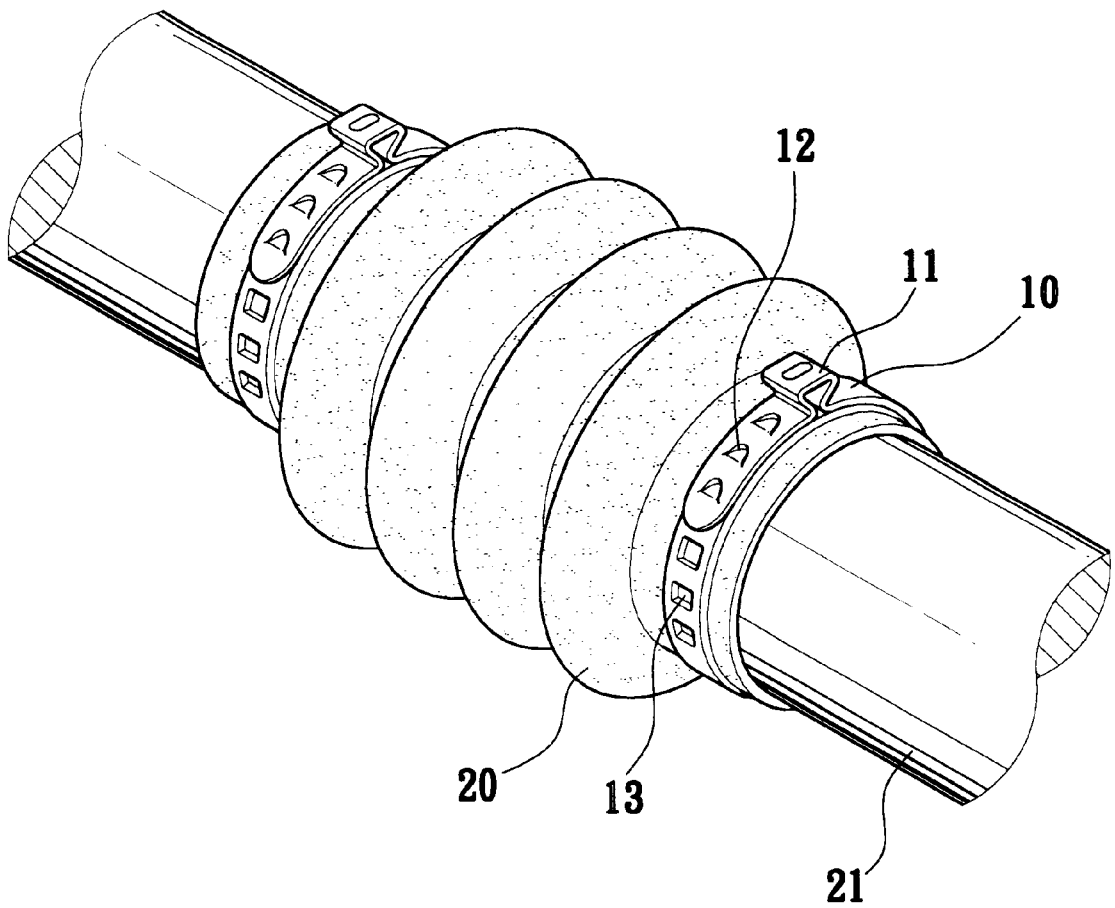
FIG. 1 is a perspective view to show the disclosed fastening belts wrapped on two ends of a bellow.
Figure 2:
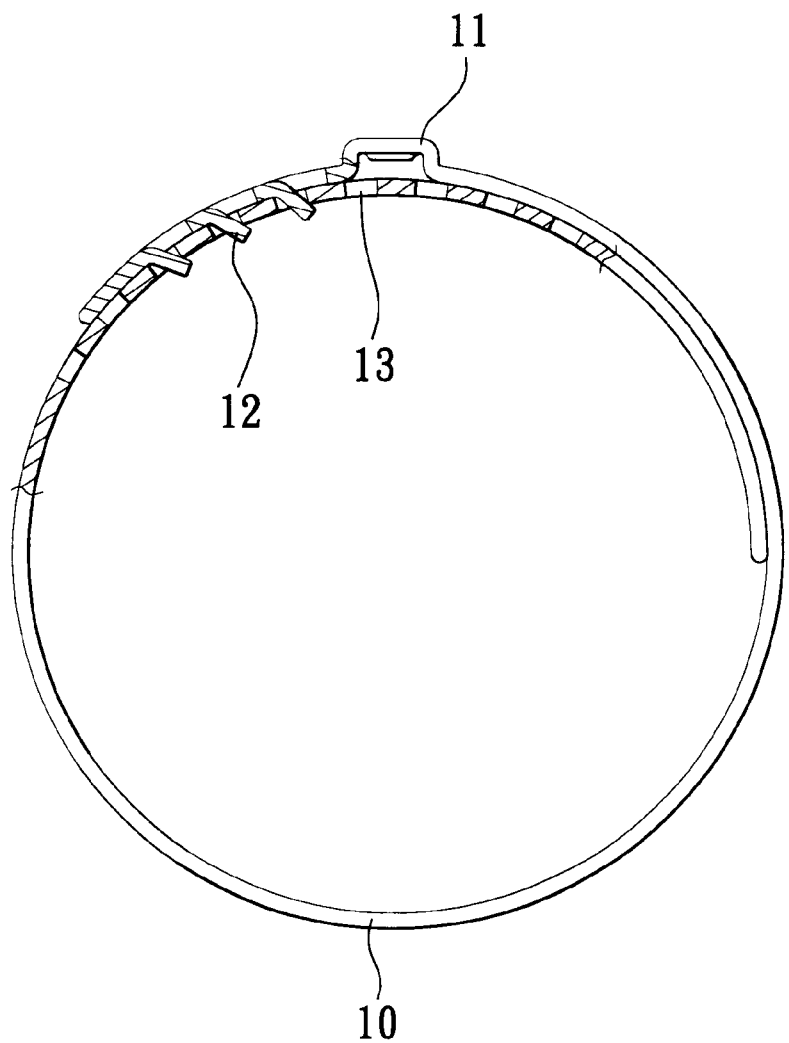
FIG. 2 is a cross sectional view to show the disclosed fastening belt.
Figure 3:
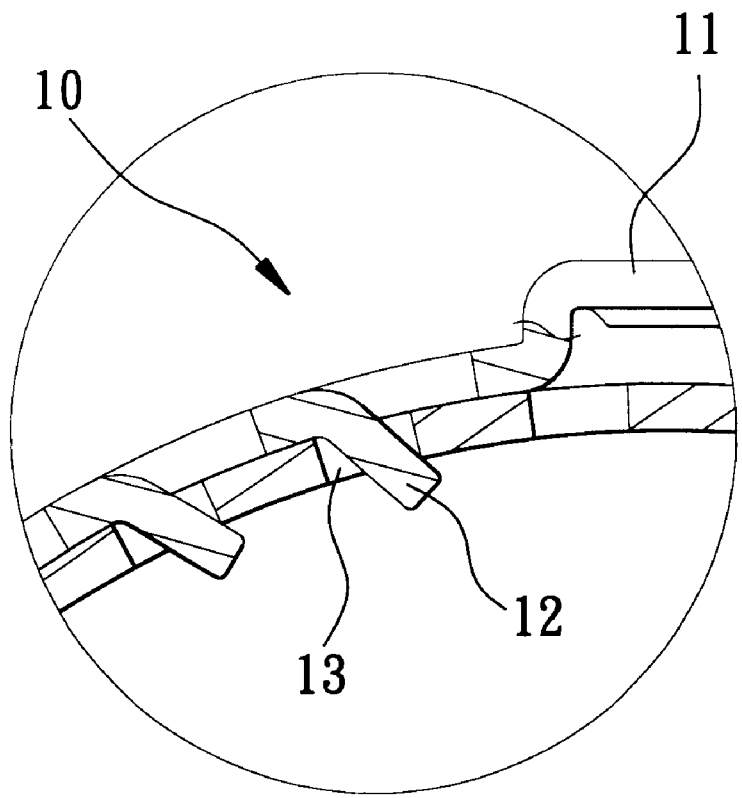
FIG. 3 is an enlarged cross sectional view to show the disclosed fastening belts.
Figure 4:
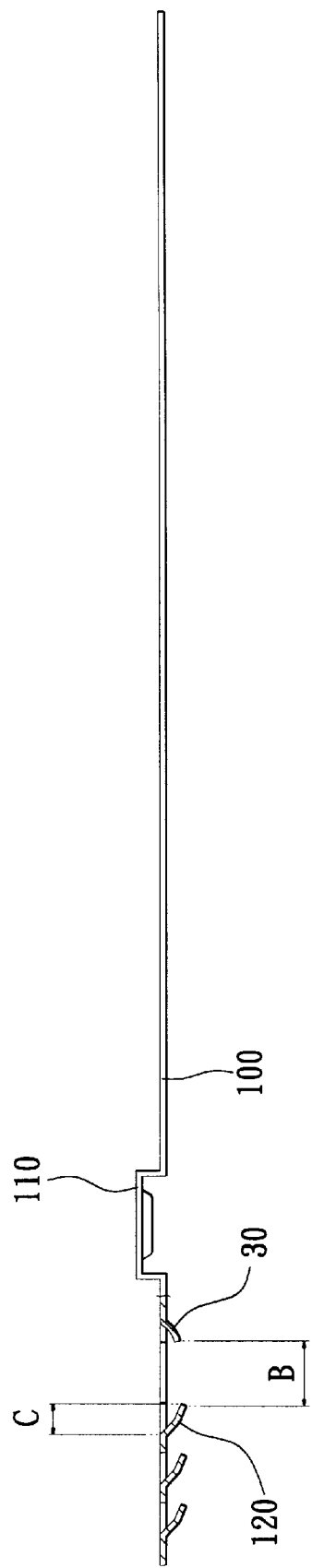
FIG. 4 is a cross sectional view to show the fastening belt of the present invention.
Figure 5:
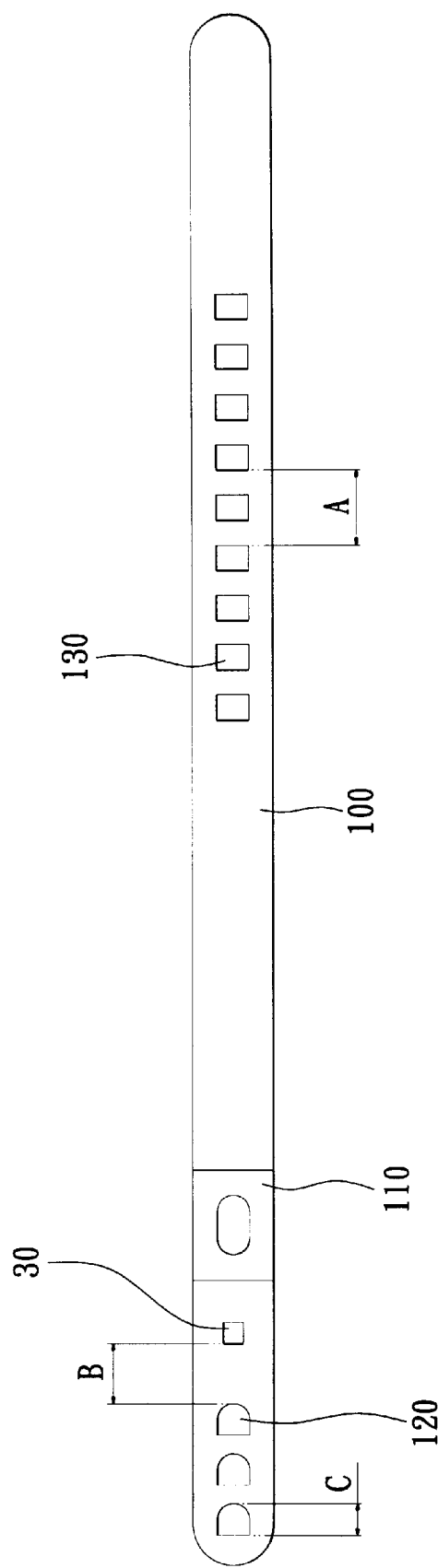
FIG. 5 is a plan view to show the fastening belt of the present invention.

Referring to FIGS. 4 and 5, the fastening belt 100 of the present invention comprises a corrugation 110 extending from a first side thereof and the corrugation 110 is located close to a first end of the belt 100. A plurality of holes 130 are defined through the belt 100 and located near a second end of the belt 100. A plurality of teeth 120 extend from a second side of the belt 100 and toward inclinedly the second end of the belt 100. A protrusion 30 extends from the second side of the belt 100 and is located between the corrugation 110 and the teeth 120. The protrusion 30 extends inclinedly toward the first end of the belt 100. A distance "B" between the protrusion 30 and the tooth located closest to the protrusion 30 is less than a distance "A" between any three consecutive holes 130. A sum of a length "C" of any one of the teeth 120 and the distance "B" between the protrusion 30 and the teeth located closest to the protrusion 30 is larger than the distance "A" between any three consecutive holes 130.

Figure 6:
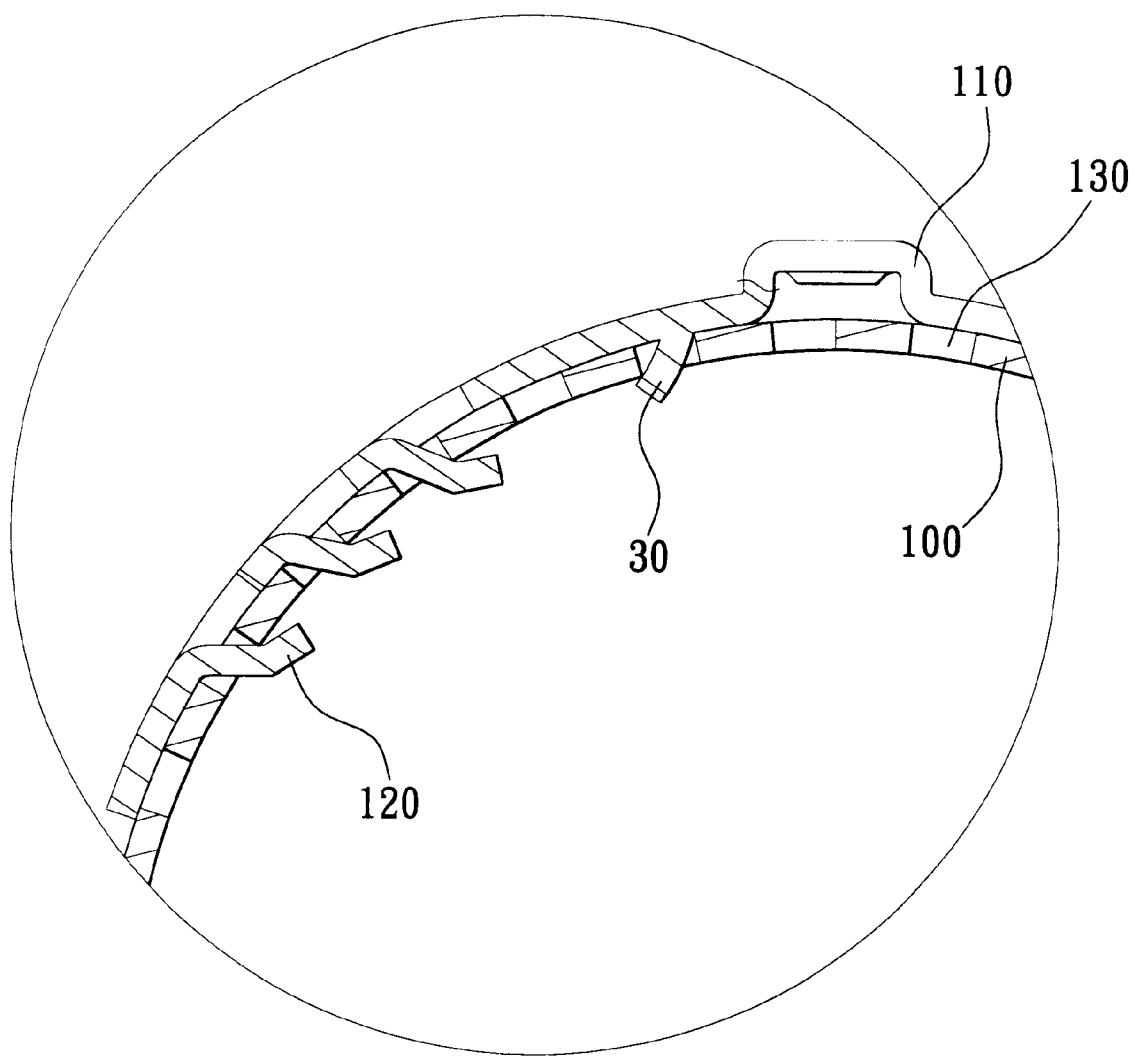
FIG. 6 is an enlarged cross sectional view to show the teeth and the protrusion are engaged with the holes of the fastening belt of the present invention.

As shown in FIG. 6, when fastening on one end of a bellow (not shown), the first end of the belt 100 is overlapped on the second end of the belt 100, and the teeth 120 are inserted into respective holes 130 of the belt 100. A tool is then used to clamp the corrugation 110 to pull the first end of the belt 100 and the protrusion 30 is moved to a position that allows the protrusion to be inserted in a hole 130. A hole having no tooth 120 engaged therewith is located between the protrusion 30 and the tooth 120 located closest to the protrusion 30. Because the protrusion 30 and the teeth 120 extend in different directions so that neither the teeth 120 nor the protrusion 30 will be disengaged from the holes 130. When loosening the fastening belt 100, the corrugation 110 is clamped to fold to its original shape by the tool and the protrusion 30 can be removed from the hole 130, and the teeth 120 are then removed from the holes 130 easily.

While we have shown and described the embodiment in accordance with the present invention, it should be clear to those skilled in the art that further embodiments may be made without departing from the scope of the present invention.

What is claimed is:

1. A fastening belt comprising:

a belt having a corrugation extending from a first side thereof and the corrugation located close to a first end of the belt, a plurality of holes defined through the belt near a second end of the belt, a plurality of teeth extending from a second side of the belt and toward inclinedly the second end of the belt, a protrusion extending from the second side of the belt and located between the corrugation and the teeth, the protrusion extending inclinedly toward the first end of the belt.

2. The fastening belt as claimed in claim 1, wherein a distance between the protrusion and the tooth located closest to the protrusion is less than a distance between any three consecutive holes, a sum of a length of any one of the teeth and the distance between the protrusion and the tooth located closest to the protrusion being larger than the distance between any three consecutive holes.

* * * * *